UNITED STATES PATENT OFFICE.

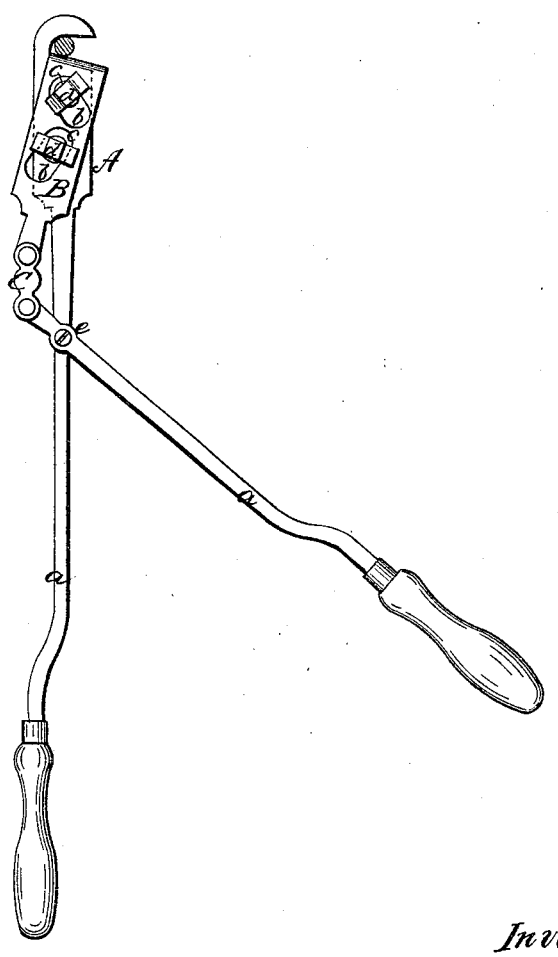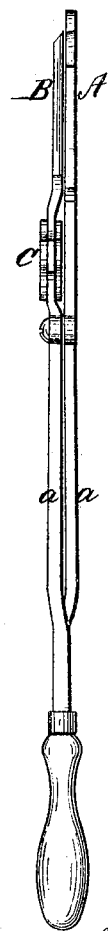

S. O. VAUGHAN AND P. W. T. VAUGHAN, OF DE KALB, ILLINOIS.

IMPROVEMENT IN PRUNING-KNIVES.

Specification forming part of Letters Patent No. 51,497, dated December 12, 1865

*To all whom it may concern:*

Be it known that we, S. O. VAUGHAN and P. W. T. VAUGHAN, of De Kalb, in the county of De Kalb and State of Illinois, have invented a new and Improved Pruning-Knife; and we do hereby declare that the following is a full, clear, and exact description thereof, which will enable others skilled in the art to make and use the same, reference being had to the accompanying drawings, forming part of this specification, in which—

Figure 1 is a plain view of our invention. Fig. 2 is an edge or side view of the same.

Similar letters of reference indicate like parts.

Our invention consists in a novel arrangement of a cutting-blade on a suitable bed-plate, which has its outer end of a hooked shape, to receive the twig and retain it during the cutting operation.

To enable others to understand our invention, we will proceed to describe it.

A represents the guiding or bed plate, and it has its outer end made in the form of a hook, which is placed on the branch to be severed or cut off. This part of the pruning-knife is made of a suitable length to constitute a lever, a, and has a handle secured on the end, which is to be grasped in the hand. On this guiding-plate we arrange the cutting-blade B, in such manner that when it is forced forward it will operate with a drawing cut upon the twig or branch which is placed in the hook. In the present instance the cutter is like a chisel in shape and has its cutting-edge beveled in a similar manner.

Two slots, b b, are made through the blade at angles relatively with each other and with the length of the blade, as shown in Fig. 1, and in these slots are placed friction-rollers c c, which lie upon the bed-plate A and are held by screw-bolts d d, the screw-bolt heads serving to clasp or hold the cutter B down upon the bed-plate A.

The cutting-blade or chisel B is connected to its lever a by a link, C, secured to the short arm of the said lever near the rivet e. This link enables the cutter to be forced forward much more easily than were it otherwise connected to the lever. The two levers a a, beyond the rivet e, are of the ordinary kind used for many purposes—such, for instance, as the handles of scissors.

From the above description it will be seen that if the branch or twig is caught in the hook it may be evenly severed by merely pressing together the levers a, and in consequence of the cutting-blade having a drawing cut the operation of cutting is more easily performed.

With pruning-hooks as ordinarily constructed it is necessary to draw hard to sever or cut off the twig or branch, and this disturbs the vine or tree, and with shears such as are used for pruning there is considerable difficulty in cutting. If the twig be not held in one hand while the shears are operated by the other, it is likely to slip along as the blades are forced together, and therefore an uneven and ragged cut is made, and the operation is a slow one. With our pruning-knife the twig is held firmly by the hook on the bed-plate, and the cutter can be operated with one hand.

We claim as new and desire to secure by Letters Patent—

The link C and friction-rollers e e, in combination with the cutting-blade B, bed-plate A, and lever a a, substantially as herein shown and described.

S. O. VAUGHAN.
P. W. T. VAUGHAN.

Witnesses:
PLINY S. FOX,
R. H. ROBERTS.